United States Patent Office 2,746,995
Patented May 22, 1956

2,746,995

PREPARATION OF MIXED ETHERS

Julian M. Mavity, Hinsdale, Ill., assignor to Universal Oil Products Company, Chicago, Ill., a corporation of Delaware No Drawing. Application July 23, 1952,
Serial No. 300,496

5 Claims. (Cl. 260—612)

This invention relates to a process for producing mixed ethers. More specifically the invention concerns the inter-reaction of dissimilar simple ethers to form mixed ethers.

In one of its embodiments the present invention relates to a process in which a simple ether is inter-reacted with a second simple ether of different composition than the first mentioned ether, in the presence of a catalyst, to form a mixed ether.

A more specific embodiment of the invention concerns a process for producing mixed ethers which comprises inter-reacting a simple ether of one composition with a second simple ether of a dissimilar composition in the presence of a solid catalyst to form a mixed ether.

A still more specific embodiment of this invention resides in the process for producing a mixed ether, such as methyl ethyl ether, in the presence of an inorganic oxide type catalyst by inter-reacting a simple ether, such as dimethyl ether, with a dissimilar simple ether, such as diethyl ether.

Other objects and embodiments of the invention referring to alternative reactants utilizable as charging stocks in the present process and to alternative catalysts within the scope of the invention will be described in detail in the following further description of the invention.

It has now been discovered that a simple ether of one composition will inter-react with a simple ether of a different composition, in the presence of a catalyst, to produce an unexpected result, namely a mixed ether containing the hydrocarbon groupings of both of the simple ethers. This inter-reaction proceeds in accordance with the equation:

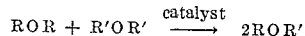

R and R' may be an alkyl or aryl radical, the R and R' being dissimilar in structure.

In like manner a simple thioether of one composition will inter-react with a simple thioether of a different composition, in the presence of a catalyst, to produce a mixed thioether, said inter-reaction proceeding according to the reaction:

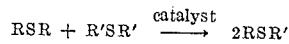

The compounds utilizable in the present process as starting materials for the production of mixed ethers include the simple ethers such as dimethyl, diethyl, dipropyl, diisopropyl, dibutyl, diisobutyl, ditertbutyl, diamyl, diisoamyl, diallyl ethers etc.; the simple aromatic ethers such as diphenyl, dibenzyl, $\beta,\beta'$-diphenyl diethyl, $\gamma,\gamma'$-diphenyl dipropyl, etc.; the thioalkyl ethers such as dimethyl sulfide, diethyl sulfide, dipropyl sulfide, diisopropyl sulfide, dibutyl sulfide, etc.; and thioaryl ethers such as diphenyl sulfide, dibenzyl sulfide, $\beta,\beta'$-diphenyl diethyl sulfide, $\gamma,\gamma'$-diphenyl dipropyl sulfide, etc.

The solid catalysts which are preferred to be used in this preparation of mixed ethers are selected from inorganic oxides such as silica, alumina, zirconia, titania, thoria, boron oxide, magnesia, etc., and also from alkaline earth oxides and alkali hydroxide mixtures such as sodium hydroxide—barium oxide, potassium hydroxide—barium oxide, sodium hydroxide—calcium oxide, potassium hydroxide—calcium oxide, etc. Certain synthetic mixtures of metal oxides such as silica-alumina, silica-zirconia, silica-alumina-zirconia, silica-magnesia, silica-alumina-magnesia, alumina-boron oxide, etc. are more effective as catalysts than the metal oxides used singly. Certain naturally occurring clays and particularly acid-treated clays, such as a natural silica-alumina mixture known in the art as Filtrol, also are effective in catalyzing the inter-reaction of simple ethers. Inorganic sulfides of the above-mentioned inorganic elements, among which are aluminum sulfide, zirconium sulfide, titanium sulfide, etc., are also used to catalyze this reaction. In addition to these catalysts, the halides, and in particular, the fluorides of the inorganic elements such as zirconium fluoride, titanium fluoride, etc. may be used as catalytic agents.

The above-mentioned reactions are normally carried out at elevated temperatures, the temperature ranging from about 200° to about 700° F. or more. Superatmospheric pressures are also utilized, the aforesaid pressures ranging from about 5 p. s. i. g. to about 2000 p. s. i. g. or more.

The process which characterizes the present invention may be carried out in either a batch or continuous flow type of operation. However, the continuous flow type operation is more effective in producing mixed ethers. The simple ethers of dissimilar compositions comprising the feed stock are heated to the desired temperature and passed into a reaction vessel under the particular pressure desired in the presence of the catalyst which has been selected for the reaction. The reaction product, comprising the mixed ether and the unconverted simple ethers, is drawn off and subjected to fractional distillation. The mixed ether is separated out as are the unconverted simple ethers, one of said simple ethers distilling at a point below the boiling point of the mixed ether, while the other simple ether distills at a point above the boiling point of the mixed ether. Upon separation, the unconverted simple ethers, that is, both of the end fractions of the fractionation may be recycled to the original reaction vessel to form part of the feed stock for the reaction.

Because of the stability of the methyl group which has less of a tendency to form by-products such as olefins, it has been found that the method of the present invention is especially effective for preparing methyl ethers such as methyl ethyl ether, methyl propyl ether, methyl isopropyl ether, methyl butyl ether, methyl tert-butyl ether, methyl isobutyl ether, methyl allyl ether, methyl benzyl ether etc.

The present invention is further illustrated with respect to specific embodiments thereof in the following examples, which, however, are not intended to limit the generally broad scope of the present invention in strict accordance therewith.

*Example I*

Approximately equimolar proportions of dimethyl ether and diethyl ether may be passed into a reaction vessel and over a catalyst consisting of a silica-alumina mixture under a pressure of about 50 atmospheres and at a temperature of about 500° F. The reaction products of the process are collected and subjected to a fractional distillation. The distillation results in three fractions or cuts, the approximate boiling temperature of cut No. 1 being −30° F., the boiling temperature of cut No. 2 being approximately 40–50° F., and the boiling temperature of cut No. 3 being approximately 95° F. The material of cuts Nos. 1 and 3 which contain unreacted dimethyl ether and diethyl ether respectively is recycled to the original reaction vessel when it becomes part of the feed stock. The material of cut No. 2 is separated out and recovered as the desired product.

*Example II*

Equimolar amounts of dimethyl ether and dipropyl ether are passed into a reactor at a temperature of about 450° F. and a pressure of about 60 atmospheres. The catalyst used in this reaction may consist of a silica-alumina-zirconia mixture. The reaction product is subjected to fractional distillation in the same manner as set forth in Example I. Cut No. 1 which boils at approximately —30° F. and cut No. 3 boiling at approximately 195° F., comprising unreacted dimethyl and dipropyl ether, respectively, are recycled to the reaction vessel to form a part of the feed stock. The contents of cut No. 2, boiling at approximately 90–100° F., comprises methyl-propyl ether.

*Example III*

As in the two previous examples equimolar portions of reactants, namely diphenyl ether and dimethyl ether, are passed into a reaction vessel. The catalyst which may be used in this reaction is a naturally occurring silica-alumina mixture, while the reaction proceeds at a temperature of about 550° F. and under a pressure of about 100 atmospheres. The reaction product is fractionally distilled and cuts Nos. 1 and 3 containing unreacted dimethyl and diphenyl ether, boiling at approximately —30° F. and 498° F., respectively, are recycled to the reaction vessel to become part of the feed stock. The material of cut No. 2 distills off at approximately 310° F. and comprises methylphenyl ether.

I claim as my invention:

1. A process for producing a mixed ether which comprises reacting dimethyl ether with another simple ether in the presence of a catalyst consisting essentially of silica and at least one metal oxide selected from the group consisting of alumina and zirconia at a temperature of from about 200° to about 700° F. and a pressure of from about 5 to about 2000 pounds per square inch.

2. The process of claim 1 further characterized in that the second-mentioned ether is diethyl ether.

3. The process of claim 1 further characterized in that the second-mentioned ether is dipropyl ether.

4. The process of claim 1 further characterized in that the second-mentioned ether is diphenyl ether.

5. The process of claim 1 further characterized in that said catalyst is a silica-alumina composite.

References Cited in the file of this patent

UNITED STATES PATENTS

| | | |
|---|---|---|
| 2,018,065 | Ipatieff | Oct. 22, 1935 |

FOREIGN PATENTS

| | | |
|---|---|---|
| 232,610 | Switzerland | Sept. 1944 |

OTHER REFERENCES

Ipatieff: J. Am. Chem. Soc. vol. 63 pgs. 969–71 (1941).